United States Patent
Olson et al.

(10) Patent No.: US 6,591,970 B2
(45) Date of Patent: Jul. 15, 2003

(54) WATER-ACTIVATABLE CONVEYOR LUBRICANT AND METHOD FOR TRANSPORTING ARTICLES ON A CONVEYOR SYSTEM

(75) Inventors: Keith Edward Olson, Apple Valley, MN (US); Minyu Li, Oakdale, MN (US); Bryan Michael Anderson, Saint Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 09/735,814

(22) Filed: Dec. 13, 2000

(65) Prior Publication Data

US 2002/0108838 A1 Aug. 15, 2002

(51) Int. Cl.[7] .............................................. R65G 45/02
(52) U.S. Cl. ...................................................... 198/500
(58) Field of Search .......................................... 198/500

(56) References Cited

U.S. PATENT DOCUMENTS

| | | | |
|---|---|---|---|
| 3,011,975 A | 12/1961 | Nitzsche et al. | 252/25 |
| 3,213,024 A | 10/1965 | Blake et al. | 252/33.3 |
| 3,664,956 A | 5/1972 | Messina et al. | 252/49.6 |
| 3,981,812 A | 9/1976 | Zletz | 252/49.6 |
| 4,289,671 A | 9/1981 | Hernandez | 260/28.5 |
| 4,324,671 A | 4/1982 | Christian et al. | 252/49.6 |
| 4,436,200 A | 3/1984 | Hodlewsky et al. | 198/851 |
| 4,642,267 A | 2/1987 | Creasy et al. | 428/413 |
| 4,719,022 A | 1/1988 | Hyde | 252/35 |
| 4,828,727 A | 5/1989 | McAninch | 252/11 |
| 4,847,324 A | 7/1989 | Creasy | 525/57 |
| 4,859,351 A | 8/1989 | Awad | 252/32.5 |
| 4,929,375 A | 5/1990 | Rossio et al. | 252/49.3 |
| 4,944,889 A | 7/1990 | Awad | 252/32.5 |
| 4,987,182 A | 1/1991 | Creasy | 525/57 |
| 5,001,009 A | 3/1991 | Whitbourne | 428/412 |
| 5,009,801 A | 4/1991 | Wider et al. | 252/33.2 |
| 5,062,979 A | 11/1991 | Scharf et al. | 252/49.3 |
| 5,064,500 A | 11/1991 | Awad | 156/665 |

(List continued on next page.)

FOREIGN PATENT DOCUMENTS

| | | |
|---|---|---|
| CA | 1157456 A | 11/1983 |
| EP | 0 339 731 A1 | 2/1989 |
| EP | 0 359 330 | 3/1990 |
| GB | 1564128 | 4/1980 |
| GB | 1601529 | 10/1981 |
| JP | 57003892 | 1/1982 |
| NL | 9300742 | 5/1993 |
| WO | 98/15301 | 4/1998 |
| WO | 98/58690 | 12/1998 |
| WO | 99/33344 | 7/1999 |
| WO | 99/55396 | 11/1999 |

OTHER PUBLICATIONS

"The Alternative to Soap and Water for Lubricating Conveyor Lines," *Food & Drink Business*, pp. 35–36 (Jan. 1998).

(List continued on next page.)

*Primary Examiner*—Joseph E. Valenza
(74) *Attorney, Agent, or Firm*—IPLM Group, P.A.

(57) ABSTRACT

The passage of a container along a conveyor is lubricated by applying to at least a portion of the container-contacting surface of the conveyor or to at least a portion of the conveyor-contacting surface of the container a coating comprising a hydrophilic material wherein the lubricating properties of the coating are enhanced by contact with a polar liquid; polymerizing or otherwise solidifying the coating; and contacting the coating with such polar liquid. If desired, the coating can be applied or polymerized on the conveyor or container while the conveyor line is in motion.

33 Claims, 2 Drawing Sheets

U.S. PATENT DOCUMENTS

| | | |
|---|---|---|
| 5,073,280 A | 12/1991 | Rossio et al. ............... 252/49.3 |
| 5,080,814 A | 1/1992 | Awad ........................ 252/49.3 |
| 5,160,646 A | 11/1992 | Scheld ....................... 252/32.5 |
| 5,174,914 A | 12/1992 | Gutzmann .................... 252/34 |
| 5,182,035 A | 1/1993 | Schmidt et al. ............... 252/34 |
| 5,191,779 A | 3/1993 | Imazu et al. .................... 72/46 |
| 5,334,322 A | 8/1994 | Williams, Jr. ................. 252/52 |
| 5,352,376 A | 10/1994 | Gutzmann ................. 252/49.3 |
| 5,389,199 A | 2/1995 | Awad et al. ................. 156/665 |
| 5,474,692 A | 12/1995 | Laufenberg et al. .......... 252/34 |
| 5,486,316 A | 1/1996 | Bershas et al. ............. 252/547 |
| 5,559,087 A | 9/1996 | Halsrud et al. ............. 508/579 |
| 5,565,127 A | 10/1996 | Laufenberg et al. ........ 508/220 |
| 5,663,131 A | 9/1997 | Winicov et al. ............ 508/580 |
| 5,672,401 A | 9/1997 | Anglin et al. ............... 428/64.1 |
| 5,681,628 A | 10/1997 | Niederst et al. ........... 428/35.7 |
| 5,686,188 A | 11/1997 | Brandt et al. ................ 428/435 |
| 5,688,855 A | 11/1997 | Stoy et al. ................... 524/505 |
| 5,700,559 A | 12/1997 | Sheu et al. .............. 428/319.7 |
| 5,747,430 A | 5/1998 | Matsushita et al. ......... 508/209 |
| 5,800,412 A | 9/1998 | Zhang et al. |
| 5,837,377 A | 11/1998 | Sheu et al. .................. 428/412 |
| 5,858,653 A | 1/1999 | Duran et al. .................... 435/6 |
| 5,863,874 A | 1/1999 | Person Hei et al. ........ 508/521 |
| 5,869,436 A | 2/1999 | Lindman .................... 508/174 |
| 5,925,601 A | 7/1999 | McSherry et al. .......... 508/425 |
| 5,935,914 A | 8/1999 | Theyssen et al. ........... 508/517 |
| 5,997,517 A | 12/1999 | Whitbourne ................ 604/265 |
| 5,997,960 A | 12/1999 | Brandt et al. ................ 427/514 |
| 6,207,622 B1 * | 3/2001 | Li et al. ...................... 508/208 |
| 6,214,777 B1 | 4/2001 | Li et al. |
| 6,288,012 B1 | 9/2001 | Li et al. |
| 6,302,263 B1 | 10/2001 | Bennett et al. |
| 6,310,013 B1 | 10/2001 | Lokkesmoe et al. |
| 2001/0003733 A1 | 6/2001 | Kupper et al. |

OTHER PUBLICATIONS

Lubrication and Lubricants, *Encyclopedia of Chemical Technology*, vol. 15, pp. 463–517.

"A fracture mechanics approach to environmental stress cracking in poly(ethyleneterephthalate)," *Polymer*, vol. 39 No. 3, pp. 75–80 (1998).

Material Safety Data Sheet for Lubostar CP (May 3, 2000).

"Environmental Stress Cracking in PET Carbonated Soft Drink Containers," Eric J. Moskala, Ph.D., Eastman Chemical Company, presented at Bev Tech 98 (Savannah, GA).

Aoike et al., "Effect of Surface Structure on Lubrication in Water of Hydrophilic/Hydrophobic Block Copolymer Coating Membranes," Sekiyu Gakkaishi 41 (4), pp. 278–284 (1998).

"Environmental Stress Cracking Resistance of Blow Molded Poly(Ethylene Terephthalate) Containers," *Polymer Engineering and Science*, vol. 32, No. 6, pp. 393–399 (Mar. 1992).

* cited by examiner

WATER-ACTIVATABLE CONVEYOR LUBRICANT AND METHOD FOR TRANSPORTING ARTICLES ON A CONVEYOR SYSTEM

TECHNICAL FIELD

This invention relates to conveyor lubricants and to a method for conveying articles. The invention also relates to conveyor systems and containers wholly or partially coated with such lubricant compositions.

BACKGROUND ART

In commercial container filling or packaging operations, the containers typically are moved by a conveying system at high rates of speed. Copious amounts of aqueous dilute lubricant solutions (typically based on fatty acids, amines or surfactants) are typically applied to the conveyor or containers using spray or pumping equipment. These lubricant solutions permit high-speed operation of the conveyor and limit marring of the containers or labels, but also have some disadvantages. For example, aqueous conveyor lubricants based on fatty amines typically contain ingredients that can react with spilled carbonated beverages or other food or liquid components to form solid deposits. Formation of such deposits on a conveyor can change the lubricity of the conveyor and require shutdown to permit cleanup. Some aqueous conveyor lubricants are incompatible with thermoplastic beverage containers made of polyethylene terephthalate and other plastics, and can cause stress cracks to form in the base of the container. Dilute aqueous lubricants typically require use of large amounts of water on the conveying line, which must then be disposed of or recycled.

SUMMARY OF THE INVENTION

The present invention provides, in one aspect, a method for lubricating the passage of a container along a conveyor comprising applying to at least a portion of the container-contacting surface of the conveyor or to at least a portion of the conveyor-contacting surface of the container a coating comprising a hydrophilic material wherein the lubricating properties of the coating are enhanced by contact with a polar liquid; polymerizing or otherwise solidifying the coating; and contacting the coating with such polar liquid.

The present invention provides, in another aspect, a lubricated conveyor or container, having a polymeric coating on a container-contacting surface of the conveyor or on a conveyor-contacting surface of the container, wherein the coating comprises a hydrophilic material and the lubricating properties of the coating are enhanced by contact with a polar liquid.

DETAILED DESCRIPTION

The invention provides a lubricant coating that reduces the coefficient of friction of coated conveyor parts and containers and thereby facilitates movement of containers along a conveyor line. The lubricants are polymerized or otherwise hardened into a polymeric film that remains in place on a desired portion of the conveyor or container. For brevity, such polymerization or solidification will sometimes be collectively referred to as "hardening". Hardening can take place via any suitable method through which the lubricant coating can be converted from a liquid or semi-liquid form to a solid, suitably durable polymeric film. For example, the lubricant can be formulated as a two-part coating composition containing a crosslinking agent or polymerization catalyst; or formulated as a one-part coating composition containing a photo- or thermally-induced polymerization catalyst; or formulated in a one-part coating composition in water or another suitable solvent or carrier.

The lubricant coating composition can be applied only where needed. In contrast to conventional aqueous conveyor lubricants, much smaller quantities of lubricant coating composition and water can be employed, thereby reducing waste, cleanup and disposal problems.

The lubricant coating composition preferably is a liquid or semi-solid at the time of application. In addition, the lubricant coating composition preferably provides a renewable coating that can be reapplied, if desired, to offset the effects of wear.

The lubricant coating composition can be applied or hardened on the conveyor line. This can be done while the conveyor is at rest or while the conveyor is moving, e.g., at the conveyor's normal operating speed.

When contacted by a polar liquid, the lubricating properties of the hardened lubricant coating are enhanced. Preferably, such lubricating quantities are enhanced even after contact with the polar liquid ceases. Preferably, the hardened lubricating coating becomes swollen by or will absorb the polar liquid. A variety of polar liquids can be employed, including water, alcohols such as isopropyl alcohol, polyols such as glycerol and polyethylene glycols, and mixtures thereof. Water is a preferred polar liquid. Following contact of the hardened lubricant coating by the polar liquid, the lubricant coating will have a reduced coefficient of friction or "COF". A preferred reduced COF is less than about 0.14, more preferably less than about 0.1.

The hardened lubricant coating preferably is relatively durable and following cure will remain in place on the conveyor or on the filled container. However, if desired the lubricant coating composition can be formulated so that it can be removed from the conveyor or container using a suitable agent, e.g., a solvent, heat such as steam heat, aqueous detergent solutions, or other removal techniques.

Figure 1:
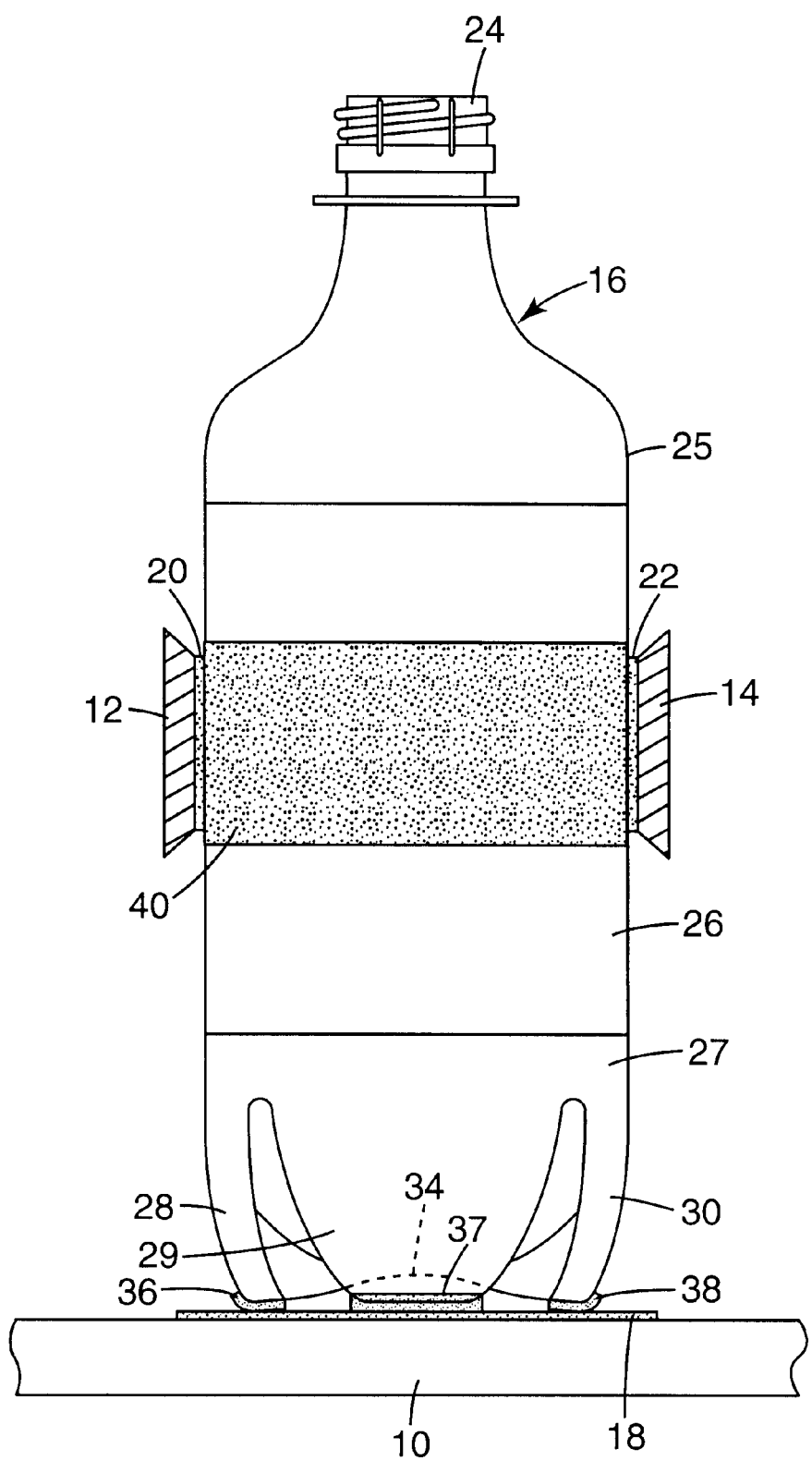
FIG. 1 illustrates a partial cross-sectional view of a lubricant-coated plastic bottle on a conveyor.

The invention is further illustrated in FIG. 1, which shows a conveyor belt 10, conveyor chute guides 12, 14 and beverage container 16 in partial cross-sectional view. The container-contacting portions of belt 10 and chute guides 12, 14 are coated with thin layers 18, 20 and 22 of a hardened lubricant coating. Container 16 is constructed of blow-molded PET, and has a threaded end 24, side 25, label 26 and base portion 27. Base portion 27 has feet 28, 29 and 30, and crown portion (shown partially in phantom) 34. Thin layers 36, 37 and 38 of a hardened lubricant coating cover the conveyor-contacting portions of container 16 on feet 28, 29 and 30, but not crown portion 34. Thin layer 40 of a hardened lubricant coating covers the conveyor-contacting portions of container 16 on label 26.

Figure 2:
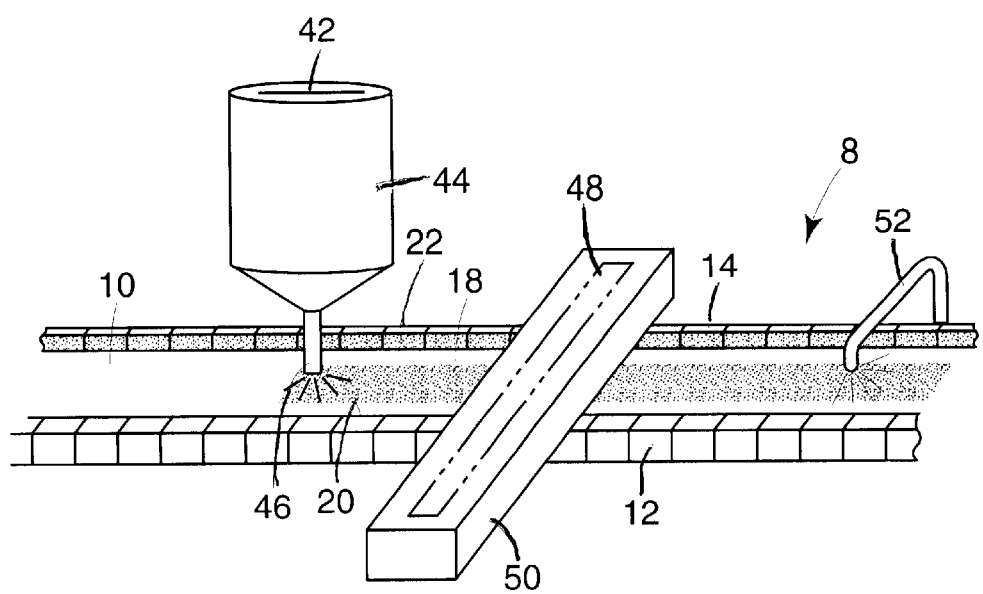
FIG. 2 illustrates shows a perspective view of a portion of a conveyor having coating, curing and water-activation stations for applying, hardening and activating lubricant coatings of the invention.

FIG. 2 shows a portion of conveyor 8 in perspective view, without containers. Liquid lubricant composition 42 is applied from hopper 44 at spray coating station 46, forming lubricant-coated areas 18, 20 and 22 on conveyor belt 10 and chute guides 12 and 14. UV light source 48 (shown in phantom) at curing station 50 polymerizes the applied coating. Water supply 52 provides a thin film of water that is absorbed by and increases the lubricity of lubricant-coated areas 18, 20 and 22.

The lubricant coating composition comprises at least one hydrophilic material. Preferably, the lubricant coating contains a polymeric or polymerizable film-forming material that includes one or more suitable hydrophilic functional groups. The lubricant coating can also contain a polymeric or polymerizable film-forming material and a separate hydrophilic material that is entrained or otherwise held within the coating when the lubricant coating composition is hardened. Non-limiting examples of suitable polymeric or polymerizable materials include urethanes; free-radically-polymerizable acrylate and methacrylate monomers such as butyl acrylate, allyl acrylate, 1,6-hexanediol diacrylate, pentaerythritol triacrylate and pentaerythritol tetraacrylate; metallic mono- and difunctional acrylates and methacrylates such as SR-633, SR-636 and SR-709 (available from Sartomer Company) and zinc acrylate; polyethylene glycol diacrylates and dimethacrylates such as SR-259, SR-344 and SR-603 (available from Sartomer Company); propylene glycol monomethacrylate; methoxy polyethylene glycol monomethacrylates such as CD-S550 (available from Sartomer Company); ethoxylated trimethylolpropane triacrylates such as SR-415 and SR-9035 (available from Sartomer Company); bisphenol-A diglycidyl ether and partially acrylated bisphenol-A epoxy resins such as Ebcryl™ resin 3605 (available from Radcure); ethoxylated bisphenol A diacrylates and dimethacrylates such as SR-9036 and SR-9038 (available from Sartomer Company); polymerizable siloxanes such as trimethylsilylmethacrylate and poly (acryloxypropylmethyl) siloxane; polymers with vinyl or (meth)acrylate functional units such as those described in U.S. Pat. No. 5,849,462, incorporated herein by reference in its entirety; cationically polymerizable or crosslinkable materials such as ethylene oxide; and monomers or oligomers and polymers that are polymerized or crosslinked through reactive functional groups, such as the photogenerated 2+2 cycloaddition of poly vinylidene acetate, the polymerization reaction between bisphenol A-epoxy resin and diethylenetriamine, and condensation reactions between diols and dianhydrides. Non-limiting examples of suitable hydrophilic materials include poly(N-vinyl lactams) such as poly(N-vinylpyrrolidinone), poly(N-vinylbutyrolactam), and poly(N-vinyl caprolactam), and polyacrylamides such as CYANAMER N-10, N-100 and N-300 (available from Cytec Industries). Mixtures of polymerizable urethanes with poly(N-vinyl lactams) are particularly preferred.

The lubricant coating composition can be waterborne, solvent-borne, or formulated as a 100% active coating composition. For example, the lubricant coating composition can be a radiation curable composition that is hardened using a suitable energy source and initiator. Preferred energy sources include ultraviolet (UV) radiation, visible light, infrared radiation, X-rays, gamma rays, and electron beam radiation. UV and visible light are particularly preferred. Examples of suitable UV- or visible-light-induced initiators include 1-phenyl-2-hydroxy-2-methyl-1-propanone; oligo{2-hydroxy-2 methyl-1-[4-(methylvinyl)phenyl] propanone}; 2-hydroxy 2-methyl 1-phenyl propan-1 one; bis (2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl)ketone; 2,2-dimethoxy-2-phenyl acetophenone; benzophenone; benzoic acid; (n-5, 2,4-cyclopentadien-1-yl) [1,2,3,4,5,6-n)-(1-methylethyl) benzene]-iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE 500, commercially available from Ciba Specialty Chemicals); bis(n,5,2,4-cyclopentadien-1-yl)-bis[2,6-difluoro-3-(1H-pyrol-1-yl)phenyl]titanium (IRGACURE 784 DC, commercially available from Ciba Specialty Chemicals); 2-benzyl-2-N,N-dimethyl amino-1-(4-morpholinophenyl)-1-butanone (IRGACURE 369, commercially available from Ciba Specialty Chemicals); and the EB3, KB1, TZT, KIP 100F, EDB and KT37 series of ESACURET™ photoinitiators (commercially available from Sartomer Inc.).

The lubricant coating composition can also be polymerized using a thermal initiator or catalyst that initiates polymerization or crosslinking upon heating, e.g., by liberating free radicals or other reactive species. Usually, it will be most convenient to prepare such lubricant coating compositions in two-part form. One-part thermally-activated lubricant coating compositions can be made using latent initiators. Examples of suitable thermal initiators or catalysts include peroxides such as benzoyl peroxide, dicumyl peroxide and t-butyl perbenzoate; and azo compounds such as 2,2'-azobisisobutyronitrile,1,1'-azobis(1-cyclohexanecarbonitrile) and 2,2'-azobis(isobutyramide) dihydrate.

The initiator is preferably present in a polymerizable lubricant coating composition in an amount sufficient to achieve the desired extent and rate of polymerization or crosslinking. Generally, the desired amount will depend on a variety of factors that will be familiar to those skilled in the art, including the efficiency of the initiator, the thickness of the lubricant coating composition, and the nature and intensity of the applied energy source. Preferably, the initiator will be present in an amount of about 0.01% to 10% by weight of the lubricant coating composition, more preferably about 0.5% to 5% by weight.

The lubricant coating composition preferably has a viscosity that will permit it to be pumped and readily applied to the conveyor or containers, and that will facilitate rapid film formation whether or not the conveyor is in motion. Solvents can be added to the lubricant coating composition to aid in application or film formation. Preferably, however, solvent usage is minimized, both for environmental reasons and to facilitate more rapid hardening of the lubricant coating composition. The lubricant coating composition can also be a water-borne latex. Waterborne lubricant coating compositions are particularly preferred. When the lubricant coating composition contains a solvent or water, the composition preferably contains about 5 to about 90 weight percent lubricant solids, more preferably about 10 to about 80 weight percent, and most preferably about 15 to about 50 weight percent.

The lubricant coating composition can also contain solid materials that provide additional lubricating properties, such as molybdenum disulfide, boron nitride, graphite, polytetrafluoroethylene (PTFE) particles, fluoroethylene-propylene copolymers (FEP), perfluoroalkoxy resins (PFA), ethylene-chlorotrifluoroethylene alternating copolymers (ECTFE), poly (vinylidene fluoride) (PVDF), waxes and mixtures thereof. Fatty acids, phosphate esters, silicones and mixtures thereof can also be employed. Lubricant coating compositions containing fluoropolymers such as PTFE are especially preferred. Preferred commercially or experimentally available solid lubricating materials include the EVERGLIDE™ and ULTRAGLIDB™ series of micronized wax powders, dispersions and emulsions such as EVERGLIDE UV-636 (25% carnauba wax emulsified in tripropylene glycol diacrylate), EVERGLIDE UV-231 D (35% fluoroethylene wax dispersed in tripropylene glycol diacrylate), ULTRAGLIDE UV-701 (40% PTFE dispersed in tripropylene glycol diacrylate) and ULTRAGLIDE UV-801 (35% PTFE in tridecyl stearate), all commercially available from Shamrock Technologies, Inc.; and the MICROSPERSION™, POLYFLUO™ AND SYNFLUO™ series of micronized waxes such as MICROSPERSION 190-50 50% aqueous dispersion of polyethylene wax and PTFE and POLYFLUO 190 micronized fluorocarbon, all commercially available from Micro Powders Inc. A preferred amount of solid lubricating material is at least about 1 wt. %, more preferably about 3 to about 50 wt. %, and most preferably about 5 to about 30 wt. %, based on the total weight of the lubricant coating composition (exclusive of any solvent or water that may have been used to disperse or dissolve the ingredients in the lubricant coating composition).

The lubricant coating composition can also contain particles (e.g., inorganic particles) that improve the wear resistance of the applied coating composition. Suitable particles are available in a wide variety of average particle diameters. Small diameter particles tend to provide better adhesion of the coating composition to the substrate, but also tend to be more expensive than large diameter particles. Large particles tend to provide better scratch resistance. Preferably, the average particle diameter is about 3 to about 50 nanometers, more preferably about 12 to about 50 nanometers. In some cases, use of a bimodal mixture of small and large diameter particles can provide a cured coating composition having an optimal balance of good coating properties and wear resistance. Silicas are particularly preferred particles, especially for use in waterborne lubricant coating compositions. Suitable silicas include fumed silicas such as AEROSIL™ OX-50 (40 nanometer average particle diameter silica available from Degussa-Hüls AG) and CABOSIL™ M5 (available from Cabot Corp.); stabilized silica sols such as KLEBOSOL™ 30H25 (25 nm average particle diameter proton stabilized waterbome colloidal silica sol having a pH of 2.2 and a 30% solids content, available from Clariant Corp.), KLEBOSOL 30H50 (50 nm average particle diameter proton stabilized waterbome colloidal silica sol having a pH of 2.5 to 3.0 and a 30% solids content, available from Clariant Corp.), KLEBOSOL 30N12 (12 nm average particle diameter ammonium ion stabilized waterbome colloidal silica sol having a pH of 9.5 to 10.5 and a 30% solids content, available from Clariant Corp.), KLEBOSOL 30N25 (25 nm average particle diameter ammonium ion stabilized waterbome colloidal silica sol having a pH of 9.6 and a 30% solids content, available from Clariant Corp.), NALCO™ 1034A (20 nanometer average particle diameter acidic colloidal silica sol having a pH of 2.8 and a 34% solids content, available from Nalco Chemical Co.), NALCO 1130 (8 nanometer average particle diameter alkaline colloidal silica sol having a pH of 10.0 and a 30% solids content, available from Nalco Chemical Co.) and NALCO 1140 (15 nanometer average particle diameter alkaline colloidal silica sol having a pH of 9.4 and a 40% solids content, available from Nalco Chemical Co.); Silica organosols such as NALCO 1057 (20 nanometer average particle diameter colloidal silica sol having a 30% solids content in ethanol, available from Nalco Chemical Co.), HIGHLINK™ OG 1–32 (25 nm average particle diameter silica organosol having a 30% solids content in ethylene glycol, available from Clariant Corp.), HIGHLINK OG 401-31 (13 nm average particle diameter silica organosol having a 30% solids content in ethylene glycol mono n-propyl ether, available from Clariant Corp.) and HIGHLINK OG 401-51 (25 nm average particle diameter silica organosol having a 50% solids content in ethyleneglycol mono n-propyl ether, available from Clariant Corp.); colloidal silicas such as LUDOX™ AM, LUDOX AM-30 (12 nm average particle diameter aqueous silica sol having a 30% solids content), LUDOX AS, LUDOX HS40, LUDOX LS, LUDOX TM and LUDOX TMA (22 nm average particle diameter aqueous silica sol having a 34% solids content), all available from DuPont Silica Products); and spherical silicas such as the MONOSPHER™ series available from EM Industries, Inc. Suitable aluminas include Aluminum Oxide C (available from Degussa-Hüls AG) and KLEBOSOL 30CAL25 alumina modified colloidal silica (available from Clariant Corp.) Other suitable particles include organic particles such as synthetic paraffin particles, and polytetrafluoroethylene particles such as POLYFLUO 171VF, 172 VF or 400 from Micro Powders Inc. These can provide both lubricity and scratch resistance.

The lubricant coating composition can contain additional components if desired. For example, the lubricant coating composition can contain adjuvants such as conventional waterborne conveyor lubricants (e.g., fatty acid lubricants), antimicrobial agents, colorants, foam inhibitors, plasticizers, adhesion promoters, cracking inhibitors (e.g., PET stress cracking inhibitors), viscosity modifiers, film forming materials, binders, antioxidants, coating aids, antistatic agents, or surfactants in amounts effective to provide the desired results.

A variety of commercially available lubricant coating compositions can be used in the present invention. For example, one preferred subclass of lubricant coating compositions for use in the invention has been used to coat the hulls of boats and personal watercraft, and is commercially available as QUICKCRAFT™ coating from RW Ski Products. This lubricant coating composition is believed to be a hydromer prepared from a combination of a water-soluble polyvinylpyrrolidone and an organic solvent-soluble, preformed thermoplastic polyurethane. Another preferred subclass of lubricant coating compositions for use in the invention has been used to coat catheters and other devices designed for insertion into the human body. These lubricant coating compositions are commercially or experimentally available from suppliers of specialty chemicals to the medical field, and include those described in U.S. Pat. Nos. 4,642,267 (Creasy et al. '267); 4,847,324 (Creasy et al. '324); 4,987,182 (Creasy et al. '182); 5,001,009 (Whitbourne '009); 5,688,855 (Stoy et al.); 5,700,559 (Lou et al.); 5, 837,377 (Sheu et al.); 5,858,653 (Duran et al.); 5,997,517 (Whitbourne '517); U.K. Patent No. 1,601,529 (Tazuke et al.); PCT application nos. WO 98/15301 (Zhang et al.) WO 98/58690 (Whitbourne et al.); WO 99/33344 (Dalla Riva Toma); and WO 99/55396 (Chudzik et al.); and in Aoike et al., "Effect of Surface Structure on Lubrication in Water of Hydrophilic/Hydrophobic Block Copolymer Coating Membranes", Sekiyu Gakkaishi 41 (4), pp 278–84 (1998).

Application of the lubricant coating composition can be carried out using any suitable technique including spraying, wiping, brushing, drip coating, roll coating, and other methods for application of a thin film. The applied lubricant coating can be continuous or discontinuous. If desired, the lubricant composition can be applied using spray equipment designed for the application of conventional aqueous conveyor lubricants, modified as need be to suit the substantially lower application rates of the lubricant coating compositions used in the invention. For example, the spray nozzles of a conventional beverage container lube line can be replaced with smaller spray nozzles or with brushes, or the metering pump can be altered to reduce the metering rate.

A variety of kinds of conveyors and conveyor parts can be coated with the lubricant coating composition. Parts of the conveyor that support or guide or move the containers and thus are preferably coated with lubricant coating composition include belts, chains, gates, chutes, sensors, and ramps having surfaces made of fabrics, metals, plastics (e.g., DELRIN™ acetal resin), composites, or combinations of these materials. Sensors can be used at one or more points along the conveyor line to determine when the hardened lubricant coating may have worn away sufficiently to require reapplication and rehardening of the lubricant coating composition.

The lubricant coating composition can also be applied to a wide variety of containers including beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; polyvinyl chlorides; and mixtures or copolymers thereof); metals (e.g., aluminum, tin or steel); papers (e.g., untreated, treated, waxed or other coated papers); ceramics; and laminates or composites of two or more of these materials. The containers can have a variety of sizes and forms, including cartons (e.g., waxed cartons or TETRA PAK™ boxes), cans, bottles and the like. Although any desired portion of the container can be coated with the lubricant coating composition, the lubricant coating composition preferably is applied only to parts of the container that will come into contact with the conveyor or with other containers. Preferably, the lubricant coating composition is not applied to portions of thermoplastic containers that are prone to stress cracking. In a particularly preferred embodiment of the invention, the lubricant coating composition is applied to the crystalline foot portion of a blow-molded, footed PET container (or to one or more portions of a conveyor that will contact such foot portion) without applying significant quantities of lubricant composition to the amorphous center base portion of the container. Also, the lubricant coating composition preferably is not applied to portions of a container that might later be gripped by a user holding the container, or, if so applied, is preferably removed from such portion prior to shipment and sale of the container. For some such applications, the lubricant coating composition preferably is applied to the conveyor rather than to the container, in order to limit the extent to which the container might later become slippery in actual use.

The hardened lubricant coating should be sufficiently thick to provide the desired degree of lubrication and coating durability. A preferred hardened lubricant coating thickness is from about 1 micrometer to about 2 mm, more preferably about 10 micrometers to about 1 mm, exclusive of any swelling that may be caused by the polar solvent.

As noted above, photopolymerizable lubricant coating compositions can be hardened using UV or visible light. Preferred sources for UV or visible light include mercury vapor arc lamps, fluorescent lamps, tungsten halide lamps, electrodeless lamps (for example, H and D bulbs from Fusion UV Systems), and lasers. Thermal energy sources that can be used with thermally-polymerized lubricant coating compositions (or that can be used to accelerate solvent removal from solvent-containing lubricant coating compositions) include ovens, infrared lamps and microwave sources. Thermal cure temperatures generally will be greater than about 20° C., e.g., from room temperature to 500° C. or from room temperature to 200° C. For use on plastic (e.g., PET) containers or conveyor belts, the thermal cure temperature should be several degrees below the melting point of the plastic (e.g., no more than about 200° C. for PET and no more than about 160° C. for polyacetal).

Radiation curable (e.g., UV-polymerizable) lubricant coating compositions can be applied to a part of the conveyor or to the bottom of a container by passing the conveyor part or the container through a dip-coating station. The lubricant coating composition can then be polymerized by exposing the conveyor or the bottom of the container to suitable radiation, e.g., UV light. If desired, the lubricant coating composition can be polymerized through the conveyor or container if the portion of the conveyor or container through which such exposure takes place is sufficiently transparent to the desired wavelengths of radiation. The conveyor or container can also be coated and polymerized from above. If need be the container or conveyor can be inverted or otherwise manipulated after the coating and polymerization operations in order to bring a lubricant-coated container or conveyor surface into contact with the conveyor or container.

Following hardening, the lubricant coating is activated to reduce its COF by exposing the coating to a suitable liquid, e.g., water. Activating liquid exposure can take place in a variety of ways, including through the use of spray jets, wipe or drip applicators, immersion baths and condensed steam.

If desired, a suitable sensor can be used on the conveyor line to detect when the polymerized coating has wholly or partially worn away to an extent sufficient to cause the coating to lose its effectiveness. The coating can then be renewed in response to the signal from the sensor and polymerized or otherwise solidified. Preferably, these steps are be carried out on the conveyor line The invention can be better understood by reviewing the following examples. The examples are for illustration purposes only, and do not limit the scope of the invention.

Example 1

Drag Force on Glass

A hardenable lubricating coating composition was evaluated by applying a ring of the coating to the perimeter of a horizontal rotating plastic disc, and measuring the drag force (frictional force) of a weighted glass rod sliding on the top surface of the coating ring. The rotating disk was made of DELRDN™ acetal resin (available from E. I. duPont de Nemours and Co.) and had a 20.2 cm diameter. One side of the disk was sanded with 320 grit silicon carbide sandpaper, washed with water and dried with a paper towel. The sanded surface was cleaned with isopropyl alcohol and air dried. Sufficient QUICKCRAFT hardenable lubricant coating composition was applied to the outer perimeter of the top surface of the disk in order to form a 2.8 cm diameter ring with an overall coating weight of about 0.2 gm. The coating was allowed to dry overnight, then heated at 105° C. for 5 minutes. The disk was cooled to room temperature, mounted on a vertical spindle and rotated at a fixed speed with the ring of coating facing up or facing down. A glass rod weighing 89 gm was centered vertically atop the perimeter of the rotating disk and connected to a solid state transducer via a thin flexible horizontal string. The disk was rotated for approximately two minutes until the measured drag force leveled off, and then rotated for one to five additional minutes. The minimum, maximum and average drag force was measured and recorded under a variety of test conditions as set out below in Table 1. Measurements made on the hardened lubricant coating (identified as "QC" in Table 1) were made with the ring of coating facing upward.

TABLE 1

Glass Rod

| Run No. | Test Conditions | Drag Force | | |
|---|---|---|---|---|
| | | Min. | Max. | Avg. |
| 1-1 | Wet with 2 ml water but no coating on disk | 15.25 | 16.60 | 15.93 |
| 1-2 | Wet with 0.25% LUBODRIVE RX in water but no coating on disk | 12.85 | 13.75 | 13.30 |
| 1-3 | Dry QC coating on disk | >28 | >28 | >28 |
| 1-4 | QC coating on disk, wet with 2 ml water | 3.65 | 6.38 | 5.01 |

The above data shows that after activation with water, the hardened lubricant coating composition provided a significant reduction in measured drag force against glass. The measured drag force levels were much lower than those observed using water alone, a conventional conveyor lubricant, or the unactivated hardened lubricant coating composition.

Example 2

Drag Force on PET

Using the method of Example 1 and a PET rod having a weight of 136 g, the minimum, maximum and average drag force was measured and recorded under a variety of test conditions as set out below in Table 2.

TABLE 2

PET Rod

| Run No. | Test Conditions | Drag Force | | |
|---|---|---|---|---|
| | | Min. | Max. | Avg. |
| 2-1 | Wet with 2 ml water but no coating on disk | 24.20 | 26.10 | 25.15 |
| 2-2 | Wet with 0.25% LUBODRIVE RX in water but no coating on disk | 18.75 | 20.75 | 19.75 |
| 2-3 | Dry QC coating on disk | 19 | 21.7 | 20.35 |
| 2-4 | QC coating on disk, wet with 2 ml water | 8.13 | 11.35 | 9.74 |

The above data shows that after activation with water, the hardened lubricant coating composition provided a significant reduction in measured drag force against PET. The measured drag force levels were much lower than those observed using water alone, a conventional conveyor lubricant, or the unactivated hardened lubricant coating composition.

Example 3

Drag Force on Metal

Using the method of Example 1 and a mild steel rod having a weight of 126 g, the minimum, maximum and average drag force was measured and recorded under a variety of test conditions as set out below in Table 3.

TABLE 3

Metal Rod

| Run No. | Test Conditions | Drag Force | | |
|---|---|---|---|---|
| | | Min. | Max. | Avg. |
| 3-1 | Wet with 2 ml water but no coating on disk | 23.85 | 25.20 | 24.53 |
| 3-2 | Wet with 0.25% LUBODRIVE RX in water but no coating on disk | 15.65 | 16.80 | 16.23 |
| 3-3 | Dry QC coating on disk | >60 | >60 | >60 |
| 3-4 | QC coating on disk, wet with 2 ml water | 10.05 | 14.23 | 12.14 |

The above data shows that after activation with water, the hardened lubricant coating composition provided a significant reduction in measured drag force against metal. The measured drag force levels were much lower than those observed using water alone, a conventional conveyor lubricant, or the unactivated hardened lubricant coating composition.

Example 4

Drag Force on PVC

A PVC rod having a diameter of 1.2 cm was dipped into the hardenable lubricant coating composition used in Example 1. The coating was air dried overnight and heated at 105° C. for 5 minutes. The rod was cooled to room temperature and weighed. The weight of the rod was 118.9 g. The drag force of the coated PVC rod against the uncoated side of the rotating plastic disk was evaluated using the method of Example 1 and three separate runs. A 2 ml portion of water was added to the disk at the start of each evaluation. The drag force of the other (uncoated) end of the PVC rod against the uncoated side of the rotating plastic disk was also evaluated using two separate runs. The results are set out below in Table 4.

TABLE 4

Coated PVC Rod

| Run No. | Test Conditions | Drag Force | | |
|---|---|---|---|---|
| | | Min. | Max. | Avg. |
| 4-1 | Water but no coating on rod or disk | 23.4 | 24.5 | 23.95 |
| 4-4 | QC coating on rod, no coating on disk, wet with 2 ml water | 6.5 | 8.37 | 7.43 |

The above data shows that after activation with water, the hardened lubricant coating composition provided a significant reduction in measured drag. The measured drag force levels were much lower than those observed using water alone.

Example 5

Solvent-Based Lubricant on PVC Surface

A coating of SLIP-COAT™ OC-301 hydrogel coating material (hybrid polymer based on polyvinylpyrrolidone and cellulose esters in an organic solvent solution, obtained from STS Biopolymers) on a polyvinyl chloride substrate was evaluated while dry and after being wet with water. Before being wet with water the coating had a non-tacky, non-slippery surface. After being wet with water, the coating remained non-tacky but had a slippery surface. The slippery surface felt roughly equivalent to the degree of slipperiness exhibited by the composition of Example 4. The coated surface maintained its low COF behavior until the water had largely evaporated from the surface. The COF was not observed to change as a function of overall time in the aqueous environment, or following rubbing of the substrate. A control sample prepared without the lubricant coating was non-slippery before, during and after water exposure.

EXAMPLE 6

Water-Based Lubricant on High-Density Polyethylene Surface

A coating of LubriLAST™ hydrogel coating material (obtained from AST Products, Inc) on a high-density polyethylene substrate was evaluated while dry and after being wet with water. Before being wet with water the coating had a non-tacky, non-slippery surface. After being wet with water, the coating remained non-tacky but had a slippery surface. The slippery surface felt roughly equivalent to the degree of slipperiness exhibited by the composition of Example 4. The coated surface maintained its low COF behavior until the water had largely evaporated from the surface. The COF was not observed to change, as a function of overall time in the aqueous environment, or following rubbing of the substrate. A control sample prepared without the lubricant coating was non-slippery before, during and after water exposure.

Various modifications and alterations of this invention will be apparent to those skilled in the art without departing from the scope and spirit of the invention, and are intended to be within the scope of the following claims.

We claim:

1. A method for lubricating the passage of a container along a conveyor comprising applying to at least a portion of the container-contacting surface of the conveyor or to at least a portion of the conveyor-contacting surface of the container a coating comprising a hydrophilic material; polymerizing or otherwise solidifying the coating; and contacting the coating with a polar liquid, wherein the lubricating properties of the coating are enhanced by contact with said polar liquid and the coating will remain in place following contact with liquid water.

2. A method according to claim 1, wherein the liquid comprises water.

3. A method according to claim 1, wherein the solidified coating becomes swollen by or will absorb the polar liquid.

4. A method according to claim 1, wherein the container comprises glass, plastic, metal or paper.

5. A method according to claim 1, wherein the container comprises polyester, polyethylene, or polycarbonate.

6. A method for lubricating the passage of a container along a conveyor comprising applying to at least a portion of the container-contacting surface of the conveyor or to at least a portion of the conveyor-contacting surface of the container a coating comprising a hydrophilic material; polymerizing or otherwise solidifying the coating; and contacting the coating with a polar liquid, wherein the lubricating properties of the coating are enhanced by contact with said polar liquid, the coating will remain in place following contact with liquid water and the coating comprises a poly(N-vinyl lactam).

7. A method according to claim 6, wherein the coating comprises poly(N-vinylpyrrolidinone), poly(N-vinylbutyrolactam) or poly(N-vinyl caprolactam).

8. A method according to claim 6, wherein the coating comprises water-soluble polyvinylpyrrolidone and organic solvent-soluble thermoplastic polyurethane.

9. A method for lubricating the passage of a container along a conveyor comprising applying to at least a portion of the container-contacting surface of the conveyor or to at least a portion of the conveyor-contacting surface of the container a coating comprising a hydrophilic material; polymerizing or otherwise solidifying the coating; and contacting the coating with a polar liquid, wherein the lubricating properties of the coating are enhanced by contact with said polar liquid, the coating will remain in place following contact with liquid water and the coating comprises a polyacrylamide.

10. A method according to claim 1, wherein the unsolidified coating comprises solid materials that provide additional lubricating properties to the solidified coating.

11. A method according to claim 1, wherein the coating also comprises particles that improve the wear resistance of the solidified coating.

12. A method according to claim 1, comprising applying the coating to the conveyor line.

13. A method according to claim 1, comprising applying the coating to the bottom surface of the container.

14. A method according to claim 1, comprising applying the coating only to those portions of the conveyor that will contact the containers, or only to those portions of the containers that will contact the conveyor.

15. A method according to claim 1, comprising polymerizing the coating on the conveyor.

16. A method according to claim 1, comprising polymerizing the coating by exposure to UV or visible light radiation or heat.

17. A method according to claim 16 further comprising transporting the container on a carrier that is transparent to UV radiation, applying the coating to the container and polymerizing the coating through the carrier.

18. A method according to claim 1, comprising applying or solidifying the coating while the conveyor is in motion.

19. A method according to claim 1, further comprising detecting that the polymerized coating has wholly or partially worn away, renewing the polymerizable coating, and polymerizing or otherwise solidifying the renewed coating.

20. A lubricated conveyor or container, having a polymeric solid coating on a container-contacting surface of the conveyor or on a conveyor-contacting surface of the container, wherein the coating comprises a hydrophilic material, the lubricating properties of the coating are enhanced by contact with a polar liquid and the coating will remain in place following contact with liquid water.

21. A lubricated conveyor or container according to claim 20, wherein the coating will become swollen by or will absorb the polar liquid.

22. A lubricated conveyor or container according to claim 20, wherein the liquid comprises water.

23. A lubricated conveyor or container according to claim 20, wherein the container comprises glass, plastic, metal or paper.

24. A lubricated conveyor or container according to claim 20, wherein the container comprises polyester, polyethylene, polycarbonate or polyvinyl chloride.

25. A lubricated conveyor or container, having a polymeric coating on a container-contacting surface of the conveyor or on a conveyor-contacting surface of the container, wherein the coating comprises a poly(N-vinyl lactam) hydrophilic material and the lubricating properties of the coating are enhanced by contact with a polar liquid.

26. A lubricated conveyor or container, having a polymeric coating on a container-contacting surface of the conveyor or on a conveyor-contacting surface of the container, wherein the coating comprises poly(N-vinylpyrrolidinone), poly(N-vinylbutyrolactam) or poly(N-vinyl caprolactam) hydrophilic material and the lubricating properties of the coating are enhanced by contact with a polar liquid.

27. A lubricated conveyor or container, having a polymeric coating on a container-contacting surface of the conveyor or on a conveyor-contacting surface of the container, wherein the coating comprises hydrophilic material prepared from water-soluble polyvinylpyrrolidone and organic solvent-soluble thermoplastic polyurethane and the lubricating properties of the coating are enhanced by contact with a polar liquid.

28. A lubricated conveyor or container according to claim 20, wherein the polymeric coating comprises particles tat improve the wear resistance of the coating.

29. A lubricated conveyor according to claim 20, wherein the coating is applied to a container-contacting surface of the conveyor.

30. A lubricated container according to claim 20, wherein the coating is applied to a conveyor-contacting surface of the container.

31. A lubricated container or conveyor according to claim 20, wherein the coating is UV polymerized.

32. A lubricated conveyor for transporting containers, wherein the conveyor has a thin polymeric solid coating on at least one container-contacting surface of the conveyor, the lubricating properties of the coating are enhanced when a polar liquid contacts the coating and after contact with the polar liquid ceases, and the coating will remain in place following contact with liquid water.

33. A conveyor according to claim 32, wherein the liquid is water.

* * * * *

UNITED STATES PATENT AND TRADEMARK OFFICE
CERTIFICATE OF CORRECTION

PATENT NO. : 6,591,970 B2
DATED : July 15, 2003
INVENTOR(S) : Keith E. Olson, Minyu Li and Bryan M. Anderson It is certified that error appears in the above-identified patent and that said Letters Patent is hereby corrected as shown below:

Column 5,
Line 4, delete "ULTRAGLIDB$^{TM}$" and insert therefor -- ULTRAGLIDE$^{TM}$ --

Column 13,
Line 17, delete "tat" and insert therefor -- that --

Signed and Sealed this

Twenty-eighth Day of June, 2005

JON W. DUDAS
*Director of the United States Patent and Trademark Office*